(12) United States Patent
Wehnes et al.

(10) Patent No.: US 8,675,934 B2
(45) Date of Patent: Mar. 18, 2014

(54) BREAST SKIN LINE DETECTION IN RADIOGRAPHIC IMAGES

(75) Inventors: Jeffrey C. Wehnes, Richardson, TX (US); James H. Pike, Carrollton, TX (US); James P. Monaco, Piscataway, NJ (US)

(73) Assignee: VuCOMP, Inc., Plano, TX (US)

( * ) Notice: Subject to any disclaimer, the term of this patent is extended or adjusted under 35 U.S.C. 154(b) by 500 days.

(21) Appl. No.: 13/168,614

(22) Filed: Jun. 24, 2011

(65) Prior Publication Data

US 2011/0274327 A1 Nov. 10, 2011

Related U.S. Application Data

(63) Continuation-in-part of application No. PCT/US2011/034699, filed on Apr. 29, 2011.

(60) Provisional application No. 61/398,571, filed on Jun. 25, 2010, provisional application No. 61/399,094, filed on Jul. 7, 2010, provisional application No. 61/400,573, filed on Jul. 28, 2010, provisional application No. 61/343,609, filed on May 2, 2010, provisional application No. 61/343,608, filed on May 2, 2010, provisional application No. 61/343,552, filed on May 2, 2010, provisional application No. 61/343,557, filed on Apr. 30, 2010, provisional application No. 61/395,029, filed on May 6, 2010, provisional application No. 61/398,571, filed on Jun. 25, 2010, provisional application No. 61/399,094, filed on Jul. 7, 2010, provisional application No. 61/400,573, filed on Jul. 28, 2010.

(51) Int. Cl.
*G06K 9/00* (2006.01)

(52) U.S. Cl.
USPC ............ 382/128; 382/266; 382/131; 382/133

(58) Field of Classification Search
USPC .................................. 382/128, 130–133, 266
See application file for complete search history.

(56) References Cited

U.S. PATENT DOCUMENTS 4,907,156 A 3/1990 Doi et al.
5,109,430 A 4/1992 Nishihara et al.
(Continued)

FOREIGN PATENT DOCUMENTS

WO WO 2011/137407 11/2011
WO WO 2011/137409 11/2011
(Continued)

OTHER PUBLICATIONS

"CheckMate™ Ultra with PeerView™ Feature," Product Brochure, R2 Technology, Inc., circa 2002.
(Continued)

*Primary Examiner* — Wesley Tucker
(74) *Attorney, Agent, or Firm* — Slater & Matsil, L.L.P.

(57) ABSTRACT

An image segmentation embodiment comprises applying a second derivative operator to the pixels of an image, growing a set of contours using seeding grid points as potential contour starting points, determining a contour strength vector for each of the contour pixels, generating a partial ellipse representing an estimated location of an object in the image, dividing the partial ellipse into a plurality of support sectors with control points, determining a contour strength and position for each contour, adjusting a position of each sector control point based on the contour positions weighted by the contour strengths of the contours centered in the respective sector, fitting the partial ellipse to the adjusted positions of the control points, and generating a segmentation mask of the object based on the partial fitted ellipse.

21 Claims, 15 Drawing Sheets

(56) References Cited

U.S. PATENT DOCUMENTS

| | | | |
|---|---|---|---|
| 5,133,020 A | 7/1992 | Giger et al. | |
| 5,301,129 A | 4/1994 | McKaughan et al. | |
| 5,359,513 A | 10/1994 | Kano et al. | |
| 5,638,458 A | 6/1997 | Giger et al. | |
| 5,729,620 A | 3/1998 | Wang | |
| 5,828,774 A | 10/1998 | Wang | |
| 5,917,929 A | 6/1999 | Marshall et al. | |
| 5,982,915 A | 11/1999 | Doi et al. | |
| 5,987,094 A | 11/1999 | Clarke et al. | |
| 6,011,862 A | 1/2000 | Doi et al. | |
| 6,014,452 A | 1/2000 | Zhang et al. | |
| 6,075,879 A | 6/2000 | Roehrig et al. | |
| 6,088,473 A | 7/2000 | Xu et al. | |
| 6,125,194 A | 9/2000 | Yeh et al. | |
| 6,138,045 A | 10/2000 | Kupinski et al. | |
| 6,141,437 A | 10/2000 | Xu et al. | |
| 6,198,838 B1 | 3/2001 | Roehrig et al. | |
| 6,233,364 B1 | 5/2001 | Krainiouk et al. | |
| 6,240,201 B1 | 5/2001 | Xu et al. | |
| 6,282,307 B1 | 8/2001 | Armato, III et al. | |
| 6,335,980 B1 | 1/2002 | Armato, III et al. | |
| 6,404,908 B1 | 6/2002 | Schneider et al. | |
| 6,483,934 B2 | 11/2002 | Armato, III et al. | |
| 6,549,646 B1 | 4/2003 | Yeh et al. | |
| 6,577,752 B2 | 6/2003 | Armato, III et al. | |
| 6,609,021 B1 | 8/2003 | Fan et al. | |
| 6,654,728 B1 | 11/2003 | Li et al. | |
| 6,683,973 B2 | 1/2004 | Li et al. | |
| 6,690,816 B2* | 2/2004 | Aylward et al. | 382/128 |
| 6,694,046 B2 | 2/2004 | Doi et al. | |
| 6,724,925 B2 | 4/2004 | Armato, III et al. | |
| 6,738,499 B1 | 5/2004 | Doi et al. | |
| 6,760,468 B1 | 7/2004 | Yeh et al. | |
| 6,766,043 B2 | 7/2004 | Zeng et al. | |
| 6,795,521 B2 | 9/2004 | Hsu et al. | |
| 6,801,645 B1 | 10/2004 | Collins et al. | |
| 6,813,375 B2 | 11/2004 | Armato III et al. | |
| 7,043,066 B1 | 5/2006 | Doi et al. | |
| 7,054,473 B1 | 5/2006 | Roehrig et al. | |
| 7,088,850 B2 | 8/2006 | Wei et al. | |
| 7,203,349 B2 | 4/2007 | Zhang et al. | |
| 7,336,809 B2 | 2/2008 | Zeng et al. | |
| 7,346,202 B1 | 3/2008 | Schneider | |
| 7,359,538 B2 | 4/2008 | Zeng et al. | |
| 7,397,938 B2 | 7/2008 | Cathier | |
| 7,403,646 B2 | 7/2008 | Sato | |
| 7,480,401 B2 | 1/2009 | Shen et al. | |
| 7,492,968 B2 | 2/2009 | Jerebko et al. | |
| 7,593,561 B2 | 9/2009 | Zhang et al. | |
| 7,616,818 B2* | 11/2009 | Dewaele | 382/199 |
| 8,488,863 B2* | 7/2013 | Boucheron | 382/133 |
| 2001/0008562 A1 | 7/2001 | Rogers et al. | |
| 2002/0016539 A1 | 2/2002 | Michaelis et al. | |
| 2002/0041702 A1 | 4/2002 | Takeo et al. | |
| 2003/0007598 A1 | 1/2003 | Wang et al. | |
| 2004/0161141 A1 | 8/2004 | Dewaele | |
| 2005/0008211 A1 | 1/2005 | Xu et al. | |
| 2005/0010106 A1 | 1/2005 | Lang et al. | |
| 2006/0083418 A1 | 4/2006 | Watson et al. | |
| 2006/0171573 A1 | 8/2006 | Rogers | |
| 2006/0177125 A1 | 8/2006 | Chan et al. | |
| 2006/0239541 A1 | 10/2006 | Florin et al. | |
| 2006/0285751 A1 | 12/2006 | Wu et al. | |
| 2007/0019852 A1 | 1/2007 | Schildkraut et al. | |
| 2007/0092864 A1 | 4/2007 | Reinhardt et al. | |
| 2007/0237401 A1 | 10/2007 | Coath et al. | |
| 2008/0002873 A1 | 1/2008 | Reeves et al. | |
| 2008/0037852 A1 | 2/2008 | Zhou et al. | |
| 2008/0037853 A1 | 2/2008 | Bernard et al. | |
| 2008/0292194 A1 | 11/2008 | Schmidt et al. | |
| 2008/0298666 A1 | 12/2008 | Mysore Siddu et al. | |
| 2008/0317322 A1 | 12/2008 | Acharyya et al. | |
| 2009/0052756 A1* | 2/2009 | Saddi et al. | 382/131 |
| 2009/0052763 A1 | 2/2009 | Acharyya et al. | |
| 2009/0097730 A1 | 4/2009 | Kasai et al. | |
| 2009/0116716 A1 | 5/2009 | Zhou | |
| 2009/0129657 A1 | 5/2009 | Huo et al. | |
| 2009/0171236 A1 | 7/2009 | Davies | |
| 2009/0180674 A1 | 7/2009 | Chen et al. | |
| 2009/0214099 A1 | 8/2009 | Merlet | |
| 2010/0002929 A1 | 1/2010 | Sammak et al. | |
| 2010/0008424 A1 | 1/2010 | Pace | |
| 2010/0054563 A1 | 3/2010 | Mendonca et al. | |
| 2010/0098343 A1 | 4/2010 | Perronnin et al. | |
| 2010/0104148 A1 | 4/2010 | Bovik et al. | |
| 2011/0274327 A1 | 11/2011 | Wehnes et al. | |
| 2011/0280465 A1 | 11/2011 | Wehnes et al. | |
| 2012/0294502 A1* | 11/2012 | Chan et al. | 382/131 |

FOREIGN PATENT DOCUMENTS

| | | |
|---|---|---|
| WO | WO 2011/137410 | 11/2011 |
| WO | WO 2011/137411 | 11/2011 |
| WO | WO 2012/006318 | 1/2012 |

OTHER PUBLICATIONS

"The ImageChecker® Technology," Patient Pamphlet, R2 Technology, Inc., circa 2002.

"ImageChecker™ CT: Server DICOM Conformance Statement," PN 390-00-448 Rev. C, R2 Technology, Inc., Sep. 2003.

"ImageChecker™ CT: Workstation DICOM Conformance Statement," PN 390-00-449 Rev. D, R2 Technology, Inc., Sep. 2003.

"Improving Sensitivity and Efficiency in Lung CT Nodule Detection," ImageChecker® CT LN-1000, Product Brochure, R2 Technology, Inc., circa 2003.

"Improving Sensitivity and Efficiency in Lung CT Nodule Detection," ImageChecker® CT, Product Brochure, R2 Technology, Inc., circa 2003.

"Integrated Tools for Streamlined Review of MDCT Lung Exams," ImageChecker® CT LN-500, Product Brochure, R2 Technology, Inc., circa 2003.

"OmniCad," Product Brochure, R2 Technology, Inc., Oct. 16, 2003.

"R2 Algorithm: The Intuitive Choice," Product Brochure, R2 Technology, Inc., 2003.

"The Total CAD Solution for Film and Digital Mammography," ImageChecker® DM, Product Brochure, R2 Technology, Inc., 2003.

"CheckMate™ Ultra with PeerView™," Webpage, http://www.r2tech.com/prd/prd005.html, R2 Technology, Inc., 2004, downloaded Jan. 16, 2004.

"Technical Specifications Sheet for the ImageChecker® Display Units," R2 Technology, Inc., 2004.

"Technical Specifications Sheet for the ImageChecker® Processing Units," R2 Technology, Inc., 2004.

R2 Technology, Inc. Products Overview Webpage, http://www.r2tech.com/prd/index.html, downloaded Jan. 16, 2004, 1 page.

R2 Technology, Inc. ImageChecker® Product Webpage, archived at http://web.archive.org/web/20040422174630/http://www.r2tech.com/prd/prd002.html, archive date Apr. 22, 2004, downloaded Jan. 7, 2013, 2 pages.

R2 Technology, Inc. Algorithm Webpage, archived at http://web.archive.org/web/20040225065830/http://www.r2tech.com/prd/prd001.html, archive date Feb. 25, 2004, downloaded Jan. 7, 2013, 2 pages.

R2 Technology, Inc. Products Overview Webpage, archived at http://web.archive.org/web/20040216010921/http://www.r2tech.com/prd.index.html, archive date Feb. 16, 2004, downloaded Jan. 7, 2013, 5 pages.

Wijk, C.V., "Detection and Segmentation of Colonic Polyps on Implicit Isosurfaces by Second Principle Curvature Flow," IEEE Transactions on Medical Imaging, vol. 29, No. 3, Mar. 2010, pp. 688-698.

* cited by examiner

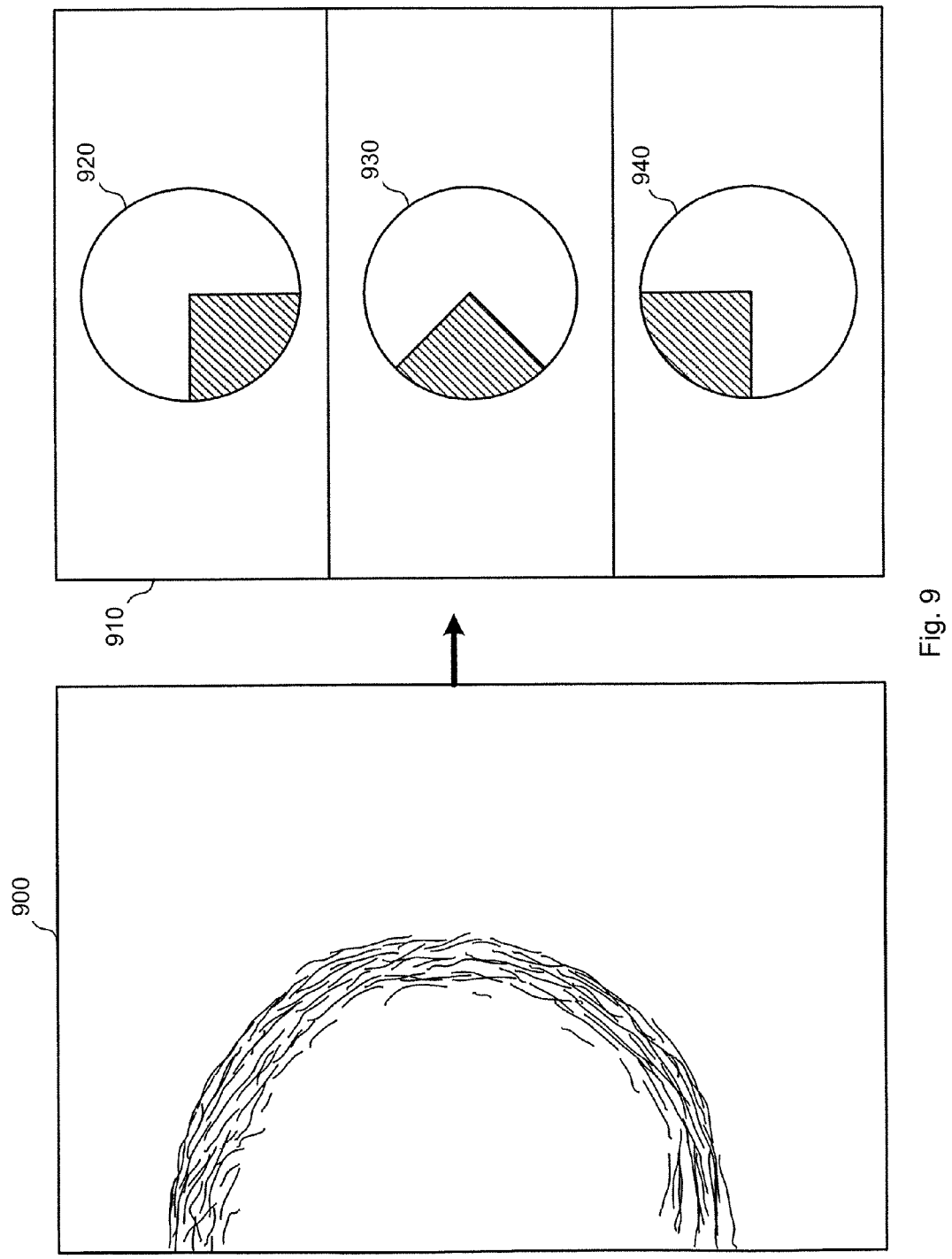

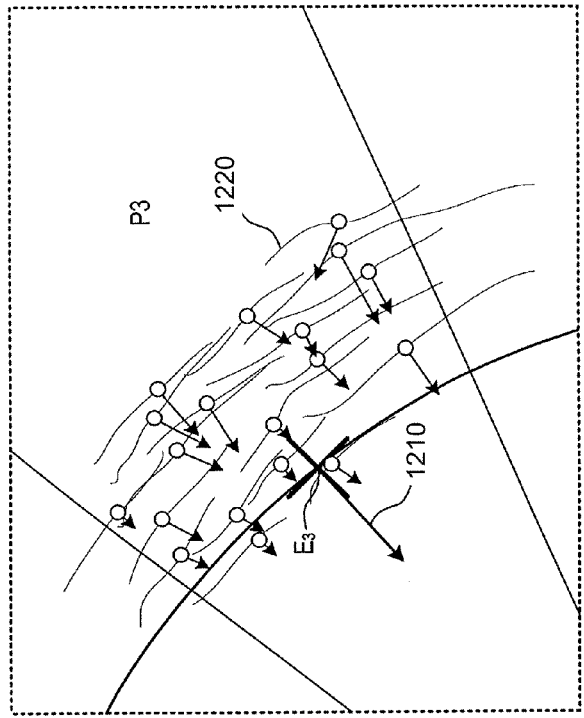
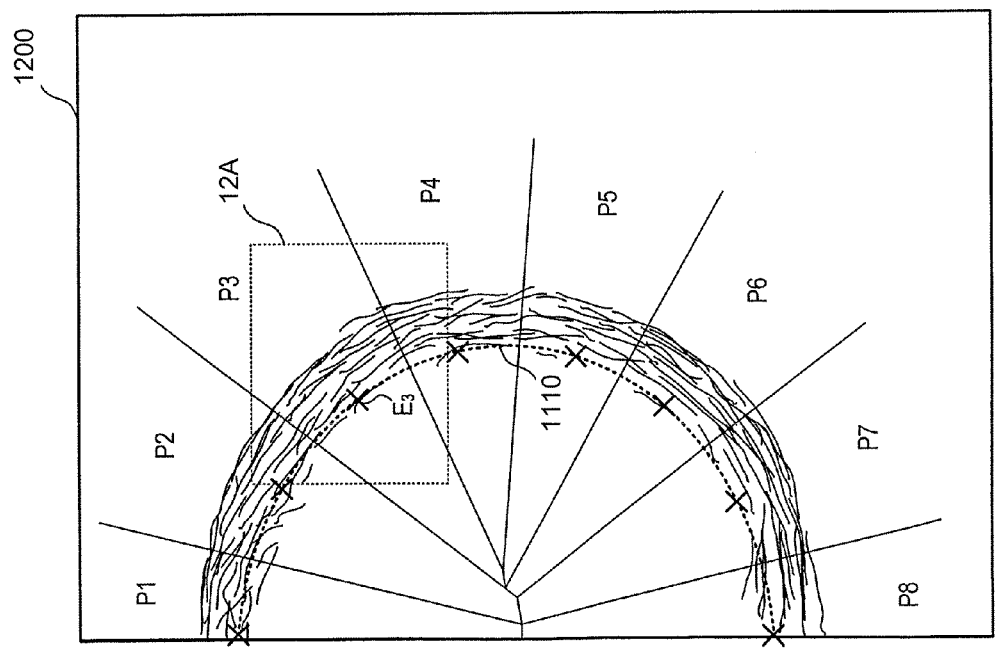

BREAST SKIN LINE DETECTION IN RADIOGRAPHIC IMAGES

This application claims the benefit of U.S. Provisional Application Ser. No. 61/398,571, filed on Jun. 25, 2010, U.S. Provisional Application Ser. No. 61/399,094, filed on Jul. 7, 2010, and U.S. Provisional Application Ser. No. 61/400,573, filed on Jul. 28, 2010, and is a continuation-in-part of International Application No. PCT/US2011/034699, filed on Apr. 29, 2011, which claims the benefit of U.S. Provisional Application Ser. No. 61/343,609, filed on May 2, 2010, U.S. Provisional Application Ser. No. 61/343,608, filed on May 2, 2010, U.S. Provisional Application Ser. No. 61/343,552, filed on May 2, 2010, U.S. Provisional Application Ser. No. 61/343,557, filed on Apr. 30, 2010, U.S. Provisional Application Ser. No. 61/395,029, filed on May 6, 2010, U.S. Provisional Application Ser. No. 61/398,571, filed on Jun. 25, 2010, U.S. Provisional Application Ser. No. 61/399,094, filed on Jul. 7, 2010, and U.S. Provisional Application Ser. No. 61/400,573, filed on Jul. 28, 2010, all of which applications are hereby incorporated herein by reference.

TECHNICAL FIELD

The present disclosure relates generally to computer-aided detection of tissue areas in radiographic images, and more particularly to a breast segmentation system and method.

BACKGROUND

Radiologists use radiographic images such as mammograms to detect and pinpoint suspicious lesions in a patient as early as possible, e.g., before a disease is readily detectable by other, intrusive methods. As such, there is real benefit to the radiologist being able to locate, based on imagery, extremely small cancerous lesions and precursors. Microcalcifications, particularly those occurring in certain types of clusters, exemplify one signature of concern. Although the individual calcifications tend to readily absorb radiation and can thus appear quite bright in a radiographic image, various factors including extremely small size, occlusion by other natural structure, appearance in a structurally "busy" portion of the image, all sometimes coupled with radiologist fatigue, may make some calcifications hard to detect upon visual inspection.

Computer-Aided Detection (CAD) algorithms have been developed to assist radiologists in locating potential lesions in a radiographic image. CAD algorithms operate within a computer on a digital representation of the mammogram set for a patient. The digital representation can be the original or processed sensor data, when the mammograms are captured by a digital sensor, or a scanned version of a traditional film-based mammogram set. An "image," as used herein, is assumed to be at least two-dimensional data in a suitable digital representation for presentation to CAD algorithms, without distinction to the capture mechanism originally used to capture patient information. The CAD algorithms search the image for objects matching a signature of interest, and alert the radiologist when a signature of interest is found.

BRIEF DESCRIPTION OF THE DRAWINGS

The following is a brief description of the drawings, which illustrate exemplary embodiments of the present invention and in which:

FIG. 9 illustrates a second derivative contour directional pruning process according to an embodiment;

FIGS. 12 and 12A show, for one iteration of an iterative process according to an embodiment, the selection of contours for refinement of estimated breast boundary points;

DETAILED DESCRIPTION OF ILLUSTRATIVE EMBODIMENTS

Figure 1:
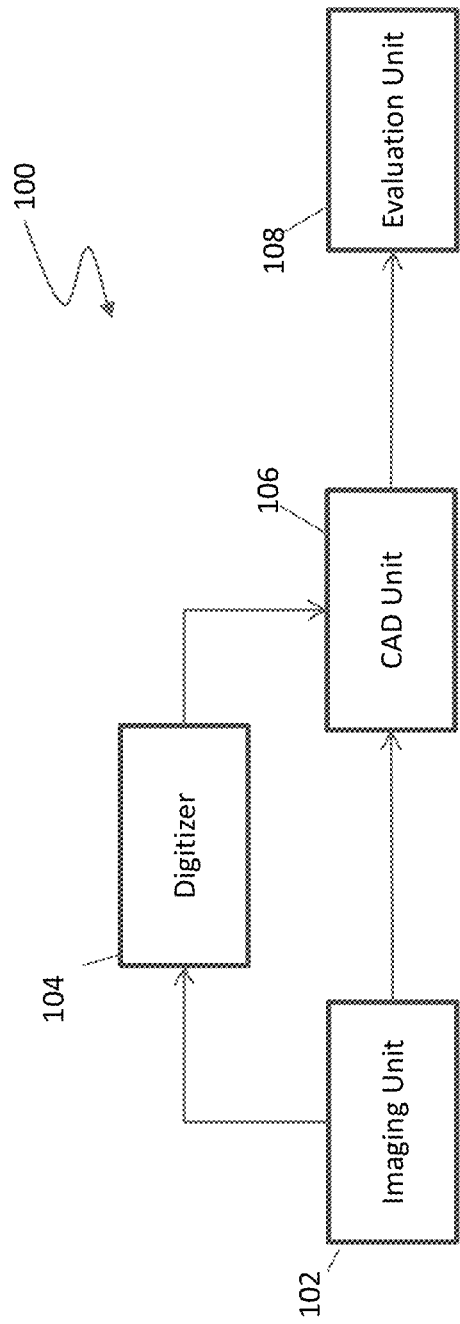
FIG. 1 is a system-level diagram for an anomaly detection system in accordance with an embodiment.

The making and using of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

For example, embodiments discussed herein are generally described in terms of assisting medical personnel in the examination of breast x-ray images, such as those that may be obtained in the course of performing a mammogram. Other embodiments, however, may be used for other situations, including, for example, detecting anomalies in other tissues such as lung tissue, any type of image analysis for statistical anomalies, and the like.

Referring now to the drawings, wherein like reference numbers are used herein to designate like or similar elements throughout the various views, illustrative embodiments of the present invention are shown and described. The figures are not necessarily drawn to scale, and in some instances the drawings have been exaggerated and/or simplified in places for illustrative purposes only. One of ordinary skill in the art will appreciate the many possible applications and variations of the present invention based on the following illustrative embodiments of the present invention.

Referring first to FIG. 1, a system 100 for assisting in detecting anomalies during, for example, mammograms, is illustrated in accordance with an embodiment. The system 100 includes an imaging unit 102, a digitizer 104, and a computer aided detection (CAD) unit 106. The imaging unit 102 captures one or more images, such as x-ray images, of the area of interest, such as the breast tissue. In the embodiment in which the system 100 is used to assist in analyzing a mammogram, a series of four x-ray images may be taken while the breast is compressed to spread the breast tissue, thereby aiding in the detection of anomalies. The series of four x-ray images include a top-down image, referred to as a cranio caudal (CC) image, for each of the right and left breasts, and an oblique angled image taken from the top of the sternum angled downwards toward the outside of the body, referred to as the medio lateral oblique (MLO) image, for each of the right and left breasts.

The one or more images may be embodied on film or digitized. Historically the one or more images are embodied as x-ray images on film, but current technology allows for x-ray images to be captured directly as digital images in much the same way as modern digital cameras. As illustrated in FIG. 1, a digitizer 104 allows for digitization of film images into a digital format. The digital images may be formatted in any suitable format, such as industry standard Digital Imaging and Communications in Medicine (DICOM) format.

The digitized images, e.g., the digitized film images or images captured directly as digital images, are provided to a Computer-Aided Detection (CAD) unit 106. As discussed in greater detail below, the CAD unit 106 processes the one or more images to detect possible locations of various types of anomalies, such as calcifications, relatively dense regions, distortions, and/or the like. Once processed, locations of the possible anomalies, and optionally the digitized images, are provided to an evaluation unit 108 for viewing by a radiologist, the attending doctor, or other personnel, with or without markings indicating positions of any detected possible anomalies. The evaluation unit 108 may comprise a display, a workstation, portable device, and/or the like.

Figure 2:
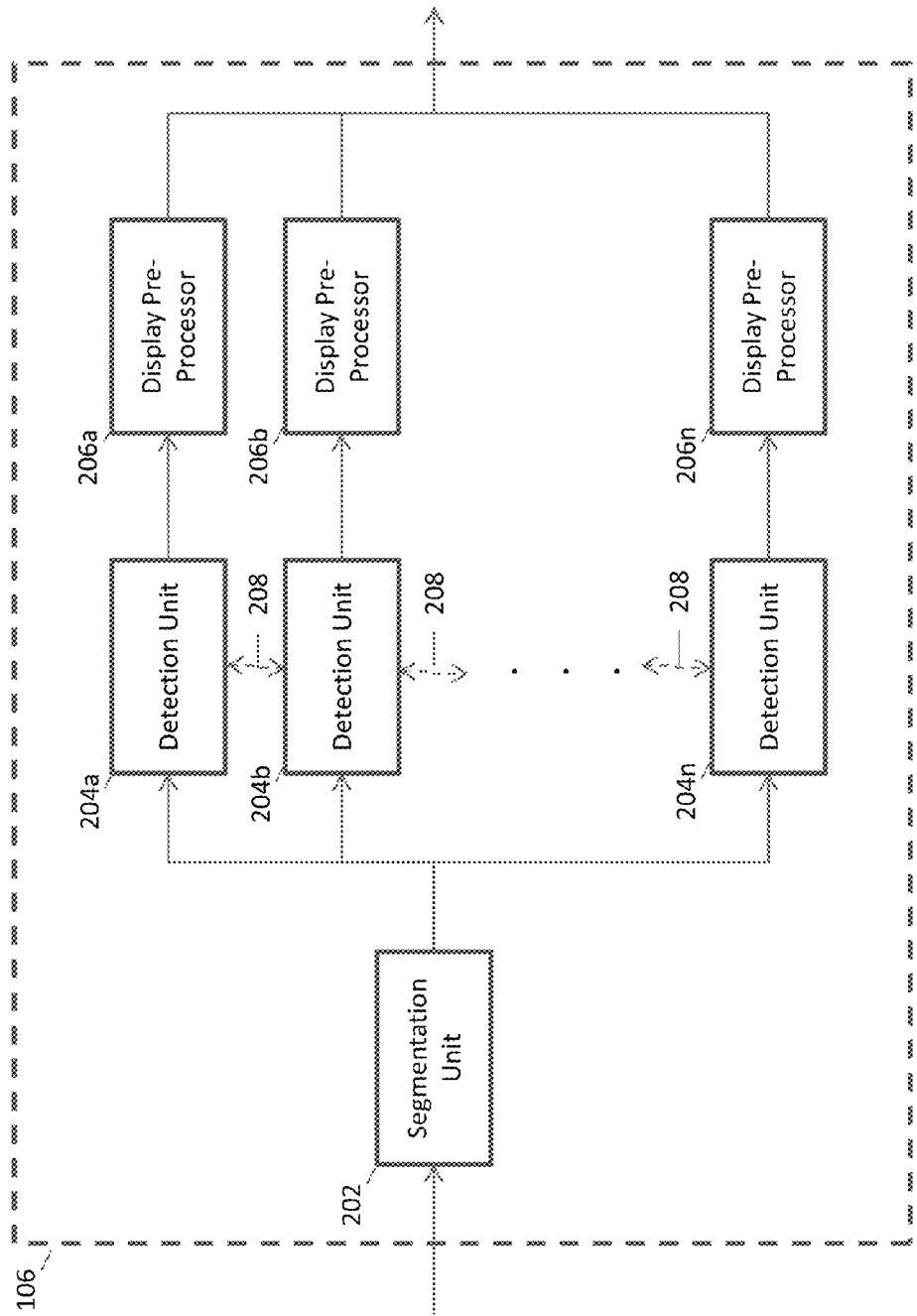
FIG. 2 is a component diagram of a Computer-Aided Detection (CAD) unit in accordance with an embodiment.

FIG. 2 illustrates components that may be utilized by the CAD unit 106 (see FIG. 1) in accordance with an embodiment. Generally, the CAD unit 106 includes a segmentation unit 202, one or more detection units 204a-204n, and one or more display pre-processors 206a-206n. As will be appreciated, an x-ray image, or other image, may include regions other than those regions of interest. For example, an x-ray image of a breast may include background regions as well as other structural regions such as the pectoral muscle. In these situations, it may be desirable to segment the x-ray image to define a search area, e.g., a bounded region defining the breast tissue, on which the one or more detection units 204a-204n is to analyze for anomalies.

The one or more detection units 204a-204c analyze the one or more images, or specific regions as defined by the segmentation unit 202, to detect specific types of features that may indicate one or more specific types of anomalies in the patient. For example, in an embodiment for use in examining human breast tissue, the detection units 204a-204n may comprise a calcification unit, a density (mass) unit, and a distortion unit. As is known in the medical field, the human body often reacts to cancerous cells by surrounding the cancerous cells with calcium, creating micro-calcifications. These micro-calcifications may appear as small, bright regions in the x-ray image. The calcification unit detects and identifies these regions of the breast as possible micro-calcifications.

It is further known that cancerous regions tend to be denser than surrounding tissue, so a region appearing as a generally brighter region indicating denser tissue than the surrounding tissue may indicate a cancerous region. Accordingly, the density unit analyzes the one or more breast x-ray images to detect relatively dense regions in the one or more images. Because the random overlap of normal breast tissue may sometimes appear suspicious, in some embodiments the density unit may correlate different views of an object, e.g., a breast, to determine if the dense region is present in other corresponding views. If the dense region appears in multiple views, then there is a higher likelihood that the region is truly malignant.

The distortion unit detects structural defects resulting from cancerous cells effect on the surrounding tissue. Cancerous cells frequently have the effect of "pulling in" surrounding tissue, resulting in spiculations that appear as a stretch mark, star pattern, or other linear line patterns.

It should be noted that the above examples of the detection units 204a-204n, e.g., the calcification unit, the density unit, and the distortion unit, are provided for illustrative purposes only and that other embodiments may include more or fewer detection units. It should also be noted that some detection units may interact with other detection units, as indicated by the dotted line 208. The detection units 204a-204n are discussed in greater detail below with reference to FIG. 3.

The display pre-processors 206a-206n create image data to indicate the location and/or the type of anomaly. For example, micro-calcifications may be indicated by a line encircling the area of concern by one type of line (e.g., solid lines), while spiculations (or other type of anomaly) may be indicated by a line encircling the area of concern by another type of line (e.g., dashed lines).

Figure 3:
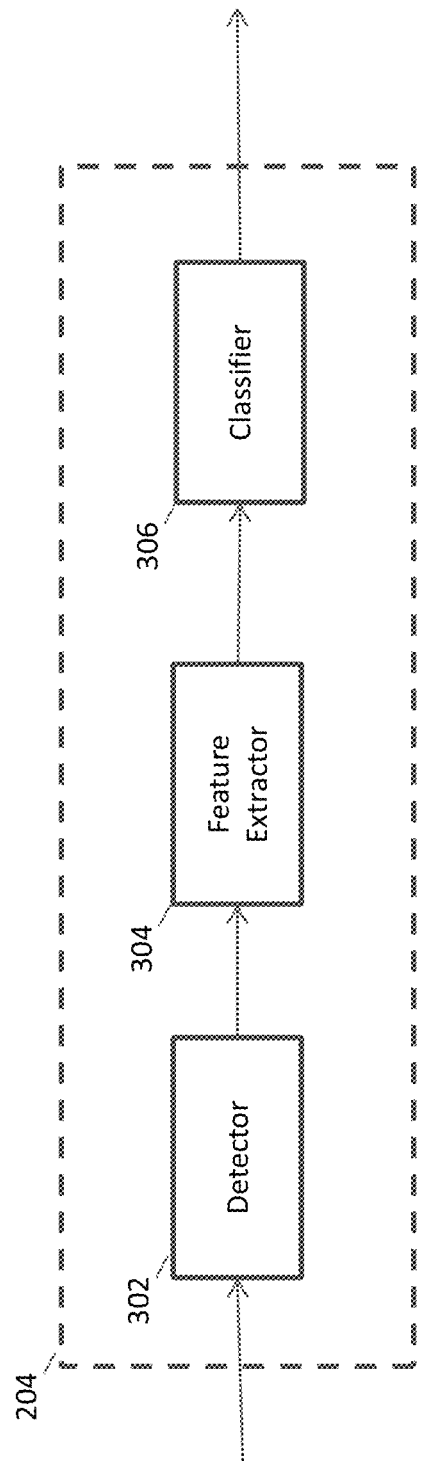
FIG. 3 is a component diagram of a detection unit in accordance with an embodiment.

FIG. 3 illustrates components of that may be utilized for each of the detection units 204a-204n in accordance with an embodiment. Generally, each of the detection units 204a-204n may include a detector 302, a feature extractor 304, and a classifier 306. The detector 302 analyzes the image to identify attributes indicative of the type of anomaly that the detection unit is designed to detect, such as calcifications, and the feature extractor 304 extracts predetermined features of each detected region. For example, the predetermined features may include the size, the signal-to-noise ratio, location, and the like.

The classifier 306 examines each extracted feature from the feature extractor 304 and determines a probability that the extracted feature is an abnormality. Once the probability is determined, the probability is compared to a threshold to determine whether or not a detected region is to be reported as a possible area of concern.

A suitable segmentation unit 202 is specified in U.S. Provisional Application Ser. Nos. 61/400,573 and 61/398,571 and co-filed U.S. patent application Ser. No. 13/168,588, suitable detection units for use in detecting and classifying microcalcifications are specified in U.S. Provisional Application Ser. Nos. 61/343,557 and 61/343,609 and International Application No. PCT/US2011/034696, a suitable detection unit for detecting and classifying malignant masses is specified in U.S. Provisional Application Ser. No. 61/343,552 and International Application No. PCT/US2011/034698, a suitable detection unit for detecting and classifying spiculated malignant masses is specified in U.S. Provisional Application Ser. No. 61/395,029 and International Application No. PCT/US2011/034699, a suitable probability density function estimator is specified in U.S. Provisional Application Ser. No. 61/343,608 and International Application No. PCT/US2011/034700, and suitable display pre-processors are specified in U.S. Provisional Application Ser. No. 61/399,094, all of which are incorporated herein by reference.

The following paragraphs provide greater details regarding a segmentation unit, such as may be utilized as a segmentation unit 202 (see FIG. 2) in accordance with an embodiment. In particular, the embodiments described below seek to detect a skin line a radiographic image.

A mammogram can contain background areas, image artifacts, breast tissue, and non-breast tissue regions in some views. A proper segmentation of the image, with the boundaries between each of these areas defined correctly, can provide benefits to CAD performance. First, it instills a radiologist with confidence in the CAD algorithms when a well-segmented image is displayed to the radiologist (and can have the opposite effect when the algorithms identify non-tissue regions as breast and place a suspicious mark outside of the breast area). It is important for thorough examination, however, that the CAD algorithms examine the entire breast portion of the image. This requires that the segmentation not be under inclusive. Also, some CAD algorithms, such as an algorithm that adjusts the base intensity of the image skin line region and algorithms that rely on calcium statistics, can be particularly sensitive to segmentation accuracy.

Figure 4B:
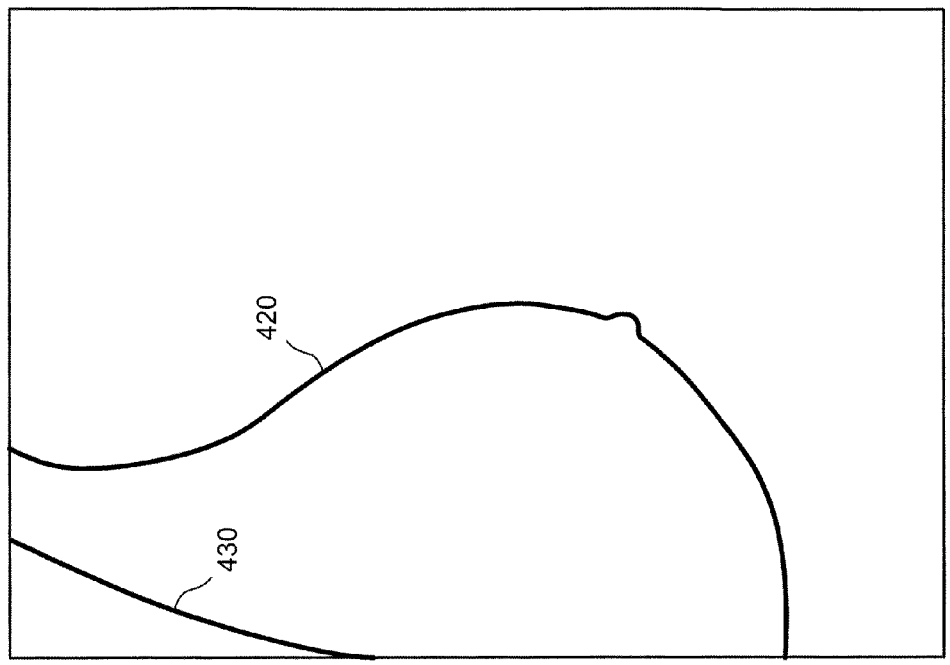
FIGS. 4A and 4B contain examples of an ideal segmentation boundary for, respectively, CC and MLO views of a breast.
Figure 4A:
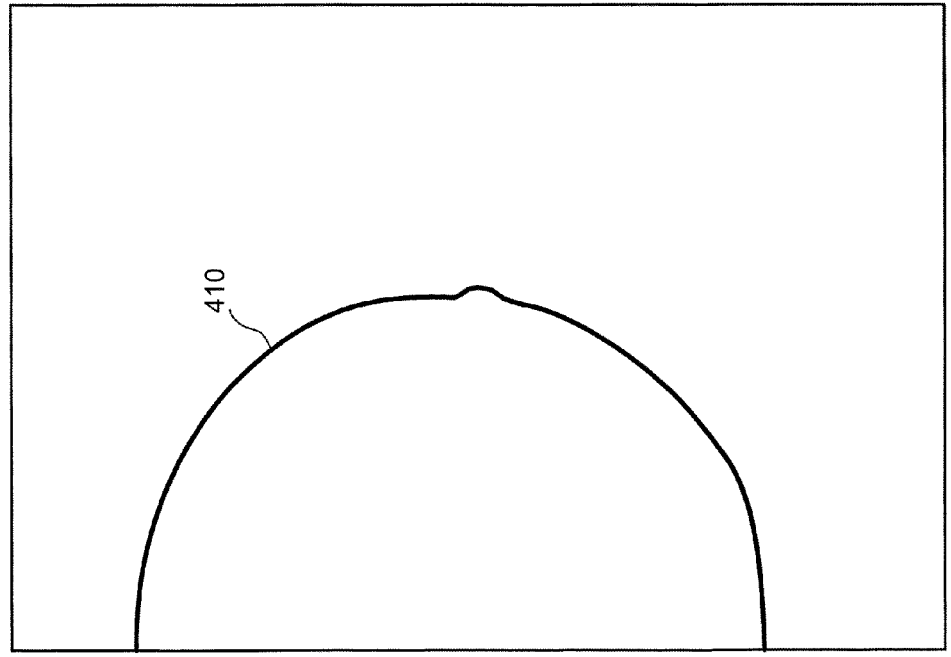

FIGS. 4A and 4B illustrate "ideal segmentations" for a hypothetical cranio-caudal (CC) view, 410, FIG. 4A, and a corresponding hypothetical mediolateral oblique (MLO) view, 420, FIG. 4B. In the following embodiments, a few a priori assumptions generally are made about the location of breast tissue in an image, due to variation in breast size and shape, operator positioning of the image device, etc. Generally, as shown in FIGS. 4A and 4B, the breast meets one edge of the image, e.g., the left edge (or can be flipped right-to-left to place the breast edge on the left, based on simple intensity measures). For a CC view, it is expected that a partial ellipse can roughly describe the breast tissue portion of the image. For an MLO view, it is expected that a partial ellipse will roughly describe the central imaged portion of the breast, but a skin line will typically vary from the ellipse and become more vertical near the top of the image, and end along the top of the image. Also, a pectoral line 430, with substantially more image density behind it than in the neighboring breast tissue, is generally visible cutting across the upper left portion of the breast region. It is the goal of segmentation to describe, as accurately as possible, the locations of skin lines 410 and 420, and the pectoral line 130.

Figure 5:
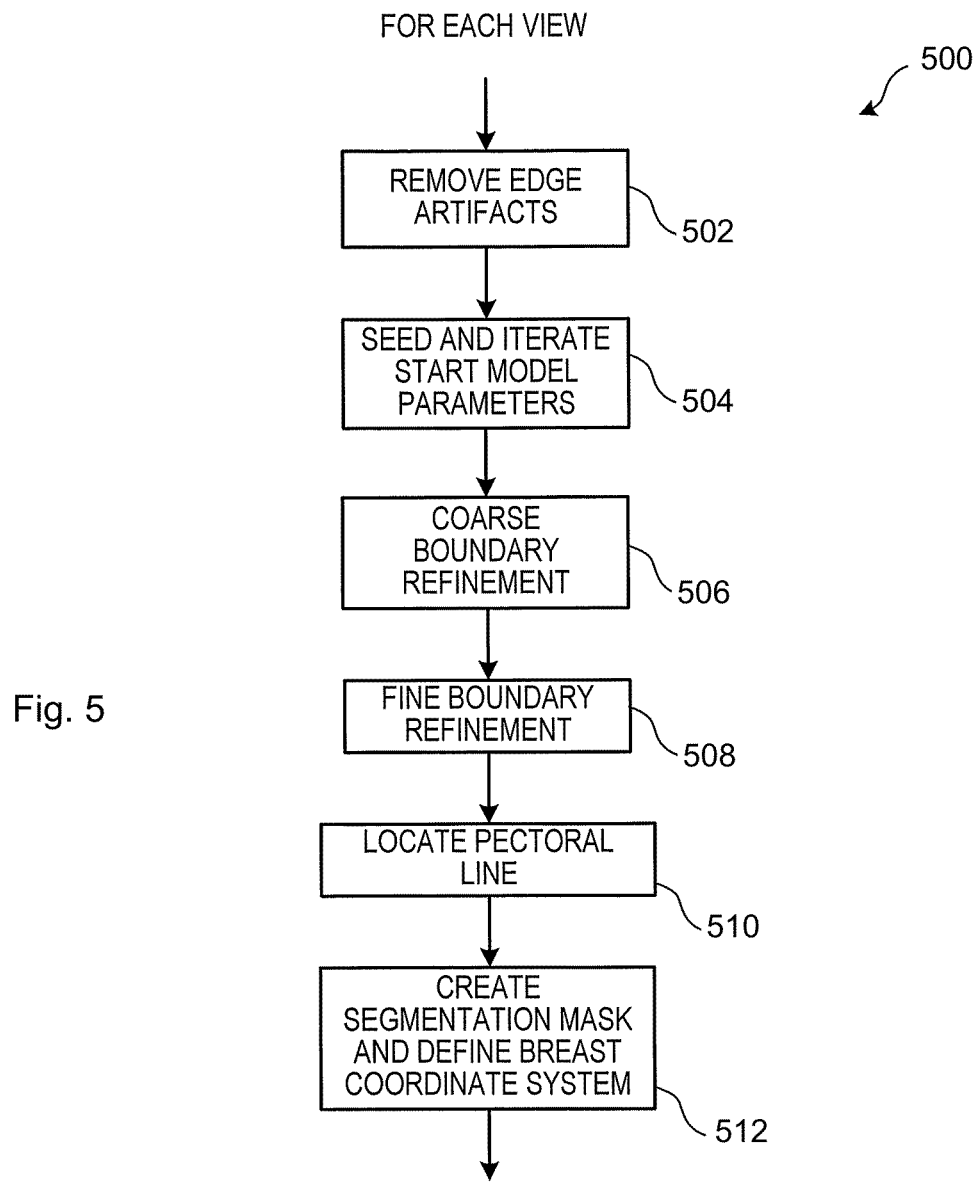
FIG. 5 contains a flowchart for a segmentation procedure according to an embodiment.

FIG. 5 contains a block diagram 500 for breast segmentation including an embodiment. Segmentation operates independently on each view presented to the system. Block 502 performs simple removal of edge artifacts, as will be described first. Block 504 then creates a start model, or initial informed "guess" at the rough boundaries of the breast. The start model is quickly iterated to produce a much closer estimate of the breast boundaries. The start model is fed to a two-stage refinement process, coarse boundary refinement 506 and fine boundary refinement 508. Each stage uses a common algorithm to more precisely align the boundary description with the actual imaged skin line, with stage 508 operating on a finer resolution image that stage 506. On MLO views, a stage 510 proceeds to locate and describe the pectoral line in the image. Stage 512 compiles the segmentation information into a segmentation mask that is passed to the CAD algorithms, along with the coordinates of a pectoral-nipple coordinate system.

The remove artifacts stage 502 seeks to mask out image areas from consideration that might confuse segmentation, and are obviously not tissue regions. For instance, a bright edge may appear as a straight line parallel or nearly parallel to an image edge, as a scanner or film alignment artifact. Such artifacts are easily detected and masked from consideration during segmentation.

Figure 6A:
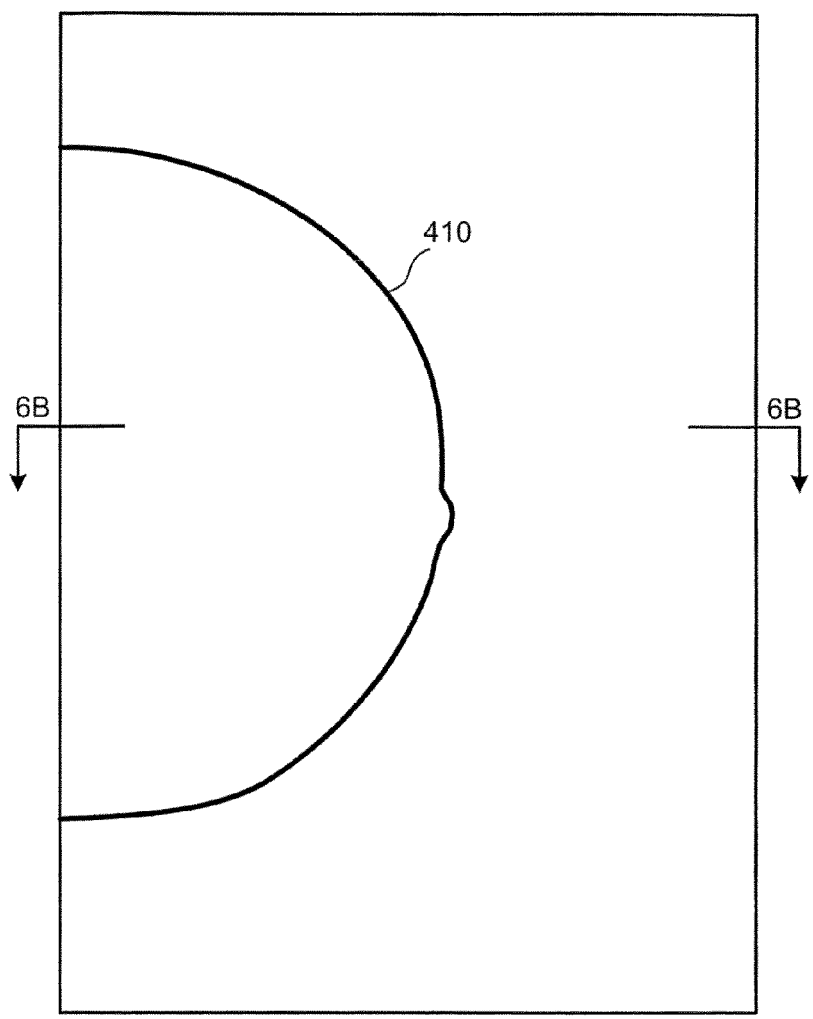
FIGS. 6A-6D show, respectively, a hypothetical mammogram, a smoothed intensity cross-section from the mammogram, and first and second derivatives of the cross-section.
Figure 6B:
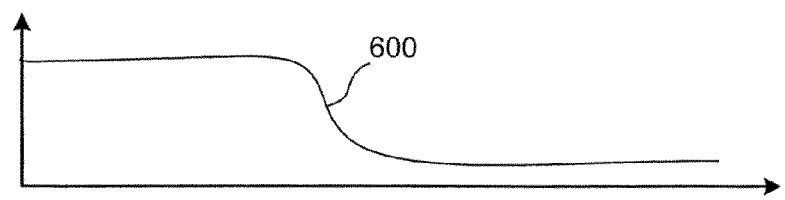
Figure 6C:
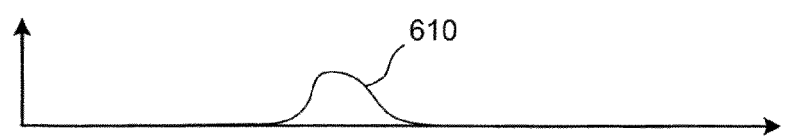
Figure 6D:
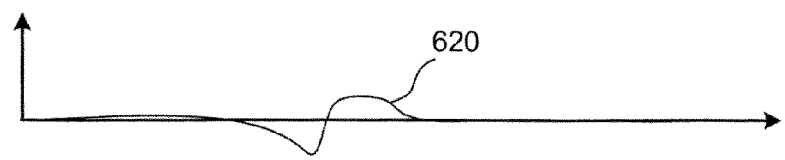

FIG. 6A is a copy of FIG. 4A, with cross-section indicators for FIG. 6B superimposed. Due to the manner in which a mammography machine compresses a breast for imaging, the majority of the imaged breast has a uniform thickness (and therefore background density in the image), tapering only in a peripheral region to a thin skin line at the breast boundary. FIG. 6B shows a smoothed intensity curve 600 for one typical cross-section through the image. FIG. 6C shows the first derivative 610 of intensity curve 600, and FIG. 6D shows the second derivative 620 of intensity curve 600. In particular, the second derivative properties weigh significantly in the detection of the breast boundary.

In one embodiment, an input image (with artifacts removed) is integer subsampled to roughly a 1000-micron pixel spacing. The subsampled image is then smoothed, e.g., by convolution with a two-dimensional Gaussian function with significant (multipixel) smoothing to remove fine detail. A two-dimensional second derivative operator is convolved with the smoothed, subsampled image to create a "curvature" image.

One embodiment uses three separate two-dimensional operators to measure curvature in x, curvature in y, and curvature along the diagonals. These are then combined in a Hessian matrix that described the curvature at each point:

$$H = \begin{vmatrix} \frac{\partial^2}{\partial x \partial x} & \frac{\partial^2}{\partial x \partial y} \\ \frac{\partial^2}{\partial x \partial y} & \frac{\partial^2}{\partial y \partial y} \end{vmatrix}$$

The Hessian matrix at each point is then decomposed to extract two eigenvalues and an angle of orientation for the major/minor axes of the Hessian:

$$H = \begin{bmatrix} \cos\theta & \sin\theta \\ -\sin\theta & \cos\theta \end{bmatrix} \begin{bmatrix} \lambda_1 & 0 \\ 0 & \lambda_2 \end{bmatrix} \begin{bmatrix} \cos\theta & -\sin\theta \\ \sin\theta & \cos\theta \end{bmatrix}$$

Examination of eigenvalues $\lambda 1$ and $\lambda 2$ determines the type of curvature present at each point. When both eigenvalues are positive, the intensity distribution is concave up at the point Likewise, when both eigenvalues are negative, the intensity distribution is concave down at the point. And when one eigenvalue is positive and the other is negative, the point is a saddle point.

As the presence of tissue in the path of x-rays causes absorption as compared to the free-air path in areas adjoining a tissue region, the present embodiment relies on the fact that moving along an image path that crosses a skin line will result in an increase in image intensity, and therefore a concave up curvature signal. Accordingly, the present embodiment masks out points where both eigenvalues are negative. When at least one eigenvalue is positive, the present embodiment selects that eigenvalue for consideration, and adjusts θ if necessary to align with (rather than orthogonal to) the direction of curvature of the largest positive eigenvalue. As an option, points can be masked from consideration when the largest positive eigenvalue fails to meet a threshold set greater than zero, and/or when one eigenvalue is positive and the other negative, the magnitude of the negative eigenvalue exceeds the positive eigenvalue.

Figure 7:
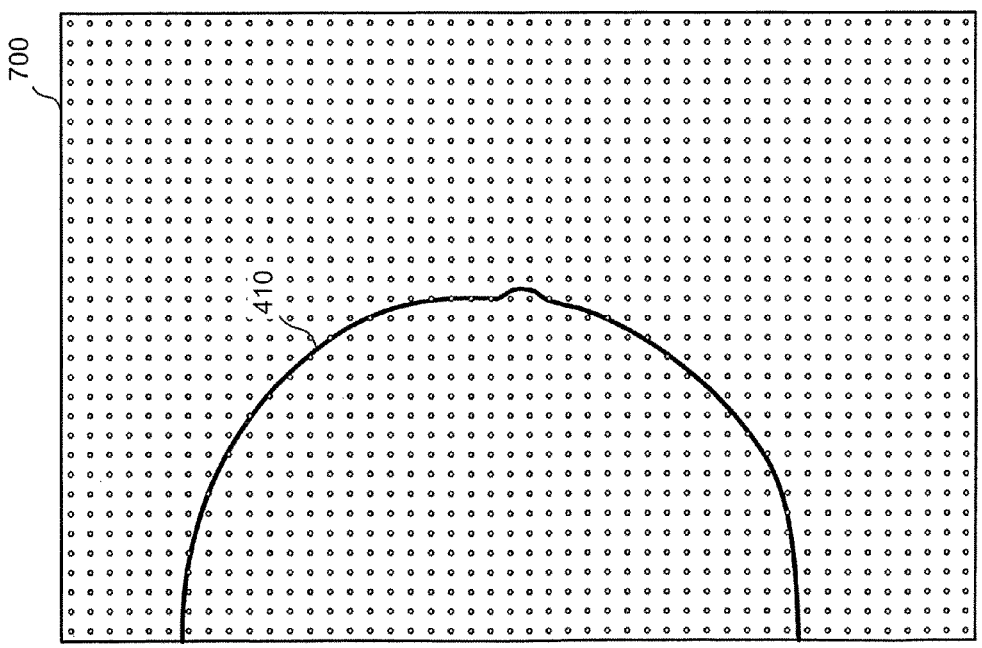
FIG. 7 shows a seeding pattern for segmentation initialization according to an embodiment.
Figure 10:
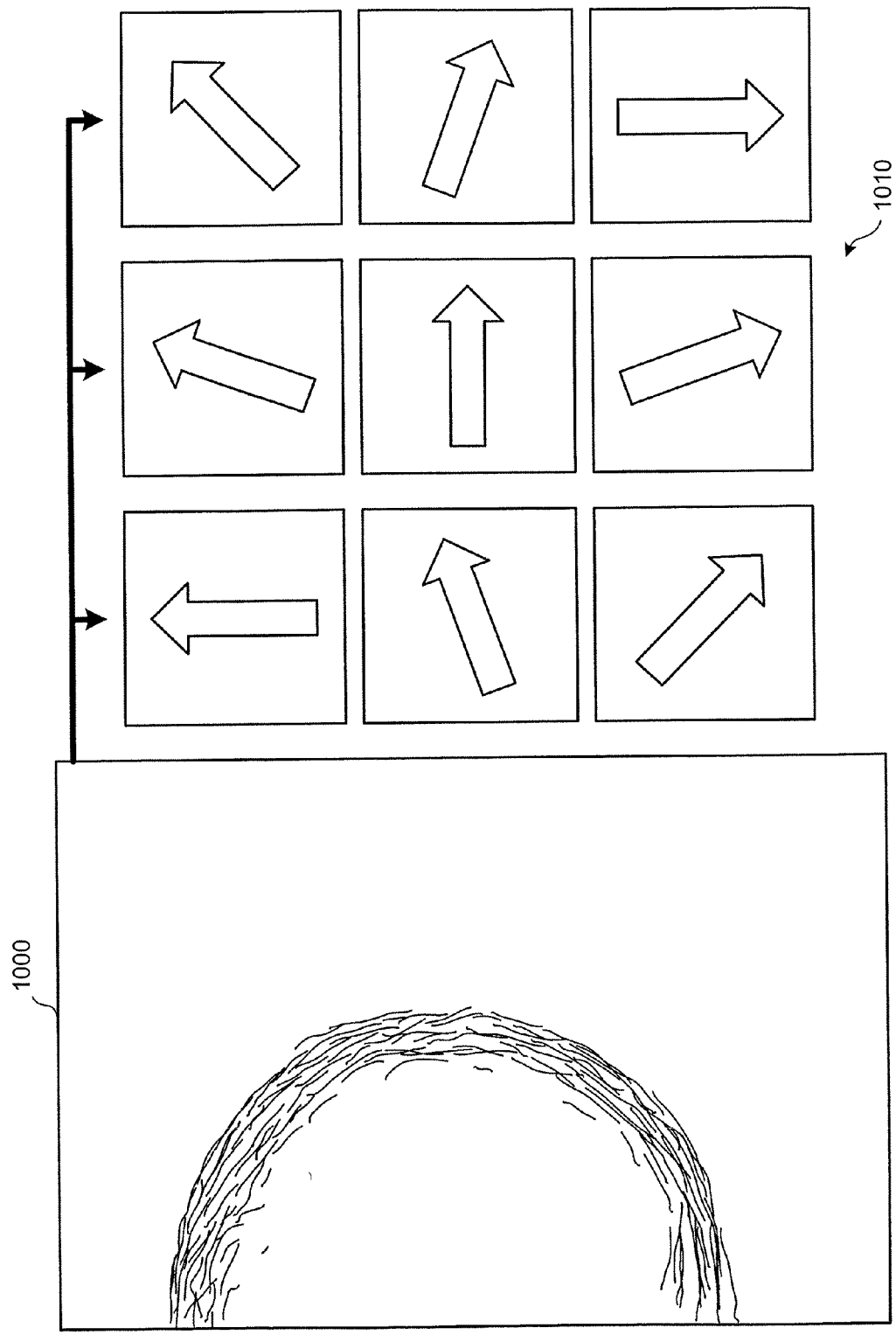
FIG. 10 depicts a directional weighting process according to an embodiment.

FIG. 7 illustrates a seeding grid 700 for an initial contour calculation. The seeding grid could include each pixel, but experimentation has shown roughly equal performance from a coarser seeding, e.g., placing a seed point every four or five pixels both in row and column.

Figure 8:
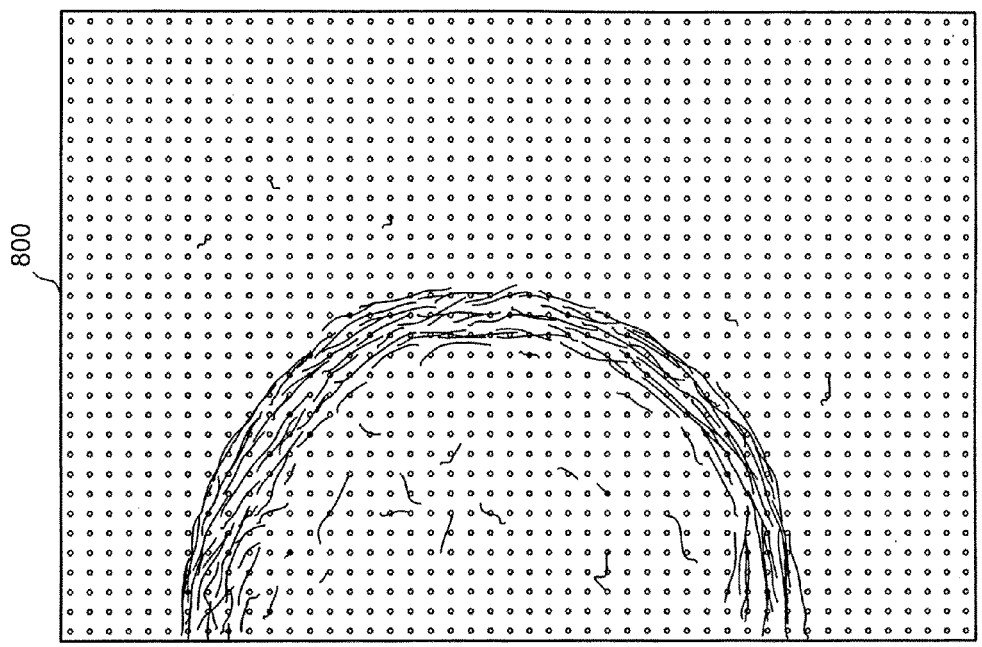
FIG. 8 illustrates a collection of second derivative contours grown, according to an embodiment, from the seeding pattern of FIG. 4.

Each pixel on seeding grid 700 is considered in turn as a start pixel for a contour, based on an eigenvalue selection process, e.g., as described above. When the current pixel on the curvature image meets the positive maximum eigenvalue criteria, it becomes a start pixel for a contour. The two neighboring pixels in the two directions orthogonal to θ are next checked. If either of those neighbors meets the positive maximum eigenvalue criteria, they are included with the start pixel in a contour, and their neighbor opposite the start pixel is checked for inclusion in the contour as well. This process continues until it terminates at both ends due to a neighbor pixel not meeting the positive eigenvalue criteria. Optionally, contour growth can also terminate when the contour meets a maximum length parameter. FIG. 8 illustrates an example of a contour set 800, after the initial contour growth phase.

Once an initial contour set has been formed, several filters are available to prune the contour set. A good initial filter examines the smoothed image intensity profile as one moves through and beyond the contour in the direction θ. When the contour is near the skin line, the intensity will generally increase by some minimum value h over a distance d, as one moves past the contour (the parameters h and d will depend to some extent on the imaging device and its specifications and usage). After this initial increase, the profile should be moving through a fairly constant minimum density of breast tissue, and therefore should not dip back towards the initial intensity. Practically, after a few inches of examining the tissue intensity profile, if no dip in intensity is observed, the contour can be confirmed. A pruned contour map 900 is shown in FIG. 9.

FIG. 9 also shows a second level of contour pruning, 910. Contour pruning 910 enforces a directionality constraint on θ, based on location in the image. In the top third of the image, a directionality constraint 920 requires the contour to be aligned somewhere between pointing to the left and pointing straight down. In the middle third of the image, a directionality constraint 930 requires the contour to be aligned somewhere between pointing up and to the left at 45 degrees, and down and to the left at 45 degrees. And in the bottom third of the image, a directionality constraint 940 requires the contour to be aligned somewhere between pointing to the left and pointing straight up. These constraints remove contours that, e.g., follow some internal structure in the breast that is at an extremely unlikely angle for a skin line.

Once the contours have been pruned, they are ready to be used in an initial rough estimate of breast position. The initial estimate has as a goal the rough location of the centroid and extent of the mapped contours. A pruned contour set 1000 is combined with nine different directional operators 1010, spaced evenly between straight up and straight down as viewed on the image, rotating clockwise. Each directional operator is defined as a vector $\vec{D}_i$ at its assigned angle. For each pixel (x,y) that is part of a contour, its contour strength (maximum positive eigenvalue) is converted to vector form $\vec{C}_{x,y}$ at angle θ. For each directional operator, an overall strength Si, a strength-weighted average row Xi, and a strength-weighted average column Yi are calculated as follows:

$$S_i = \sum_{x,y} \max(0, \vec{D}_i \cdot \vec{C}_{x,y})$$

$$X_i = \sum_{x,y} x \max(0, \vec{D}_i \cdot \vec{C}_{x,y})$$

$$Y_i = \sum_{x,y} y \max(0, \vec{D}_i \cdot \vec{C}_{x,y})$$

This formulation provides a maximum contribution to a contour pixel's eigenvalue that is aligned with the directional operator, decreasing to zero contribution when the alignment is orthogonal, and then clamped at zero by the max( ) function for contours aligned oppositely (negative dot product) with the directional operator.

Figure 11:
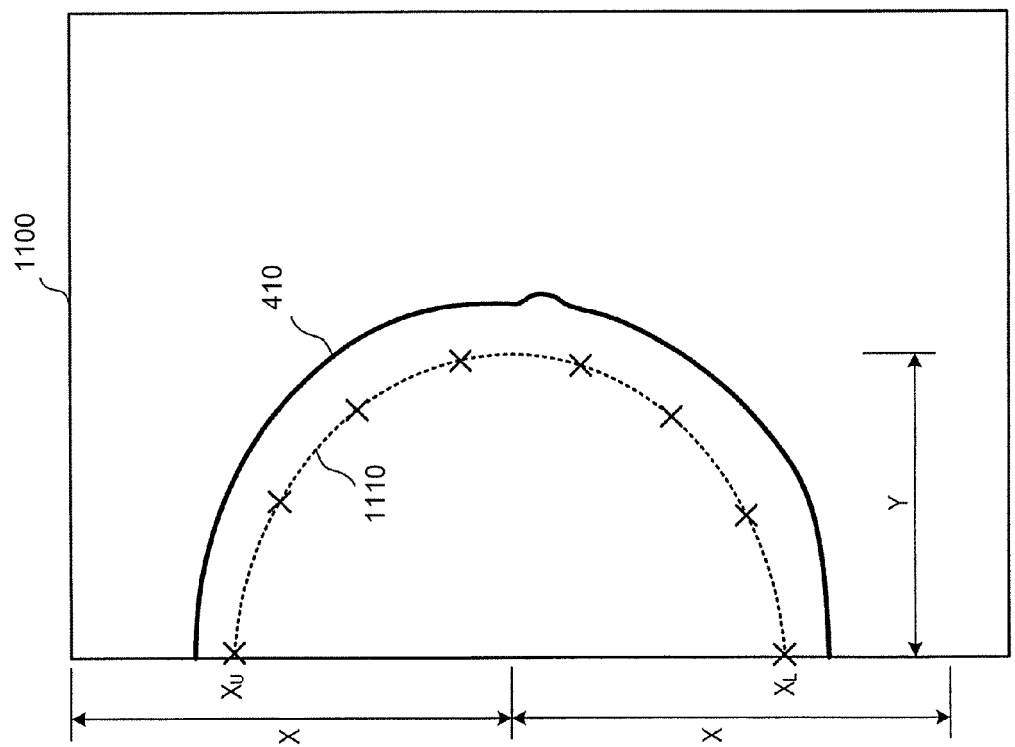
FIG. 11 shows a breast segmentation start model obtained from the directional weighting of the contours according to an embodiment.

The initial estimate combines the weighted results from the nine operators to produce estimates for seeding the breast location, as shown in FIG. 11. For instance, the center of the breast along the left side of the image can be estimated as the weighted sum $$X = \sum_{i=0}^{8} X_i \Big/ \sum_{i=0}^{8} S_i$$

and the protrusion of the breast into the image from left to right can be estimated as $$Y = \sum_{i=0}^{8} Y_i \Big/ \sum_{i=0}^{8} S_i.$$

Various measures can be used to initially estimate the vertical extent of the breast, for instance defining the upper side XU=X8/S8 and the lower side XL=X0/S0. The extent measures XU, XL, and Y are purposely underinclusive to place the initial estimate interior to the actual breast extent. These parameters are used to construct an ellipse 1110 that intersects the image so as to define an initial segmentation estimate. The next step will refine the initial estimate.

FIG. 12 illustrates the setup 1200 for the first refinement step from the initial estimate 1210. A number of points (marked by Xs in FIG. 12, one labeled as E3(0)) are set up equally spaced along the perimeter of ellipse 1110. Each point is allowed to consider contours for support that are closer to that point than to other points on ellipse 1110. The support regions for the eight points shown are marked respectively P1 to P8.

FIG. 12A shows an enlarged view of support region P3 for control point E3(0). Within the support region, each contour centered in that region is examined, and is allowed to make a single contribution to the realignment of the estimated skin line point in support region P3. For each contour k in the support region P3, the system calculates a dot product between the vectorized contour strength eigenvalue $\vec{C}_{x,y}$ at each contour pixel x,y and the normal to ellipse 1110 at the control point, 1210. Among all of the dot products for contour k, a contour strength Sk is selected as the maximum dot product seen for the contour, and the contour's position Pk is set to the coordinates of the maximum dot product. If the contour strength vector and the normal to ellipse do not agree within at least 45 degrees in orientation, however, the contour's contribution is ignored (see, e.g., contour 1220, which has a strong contribution but an errant direction, and so would be ignored). After all contours have been examined in this manner, an iterated control point E3(1) is adjusted using the weighted contour positions. The adjustment can be based on a weighted median or percentile or a weighted sum, such as the following formula that uses a parameter to move the control point some fraction of the weighted residuals:

$$E_3(1) = \alpha E_3(0) + (1-\alpha)\frac{\sum_{all\ k} S_k P_k}{\sum_{all\ k} S_k}$$

Figure 13B:
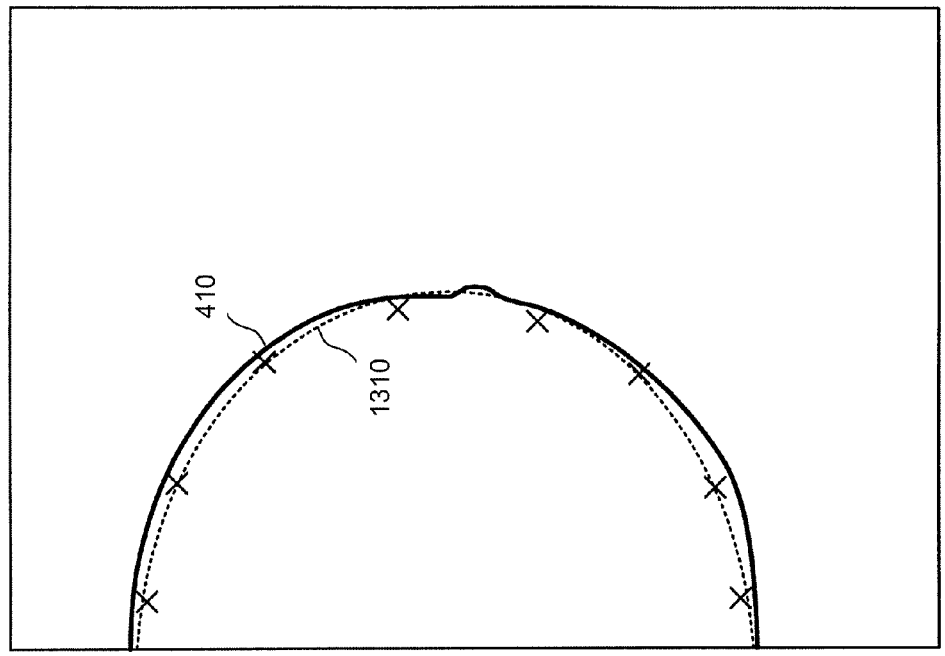
FIGS. 13A and 13B show an elliptical curve fit, according to an embodiment, taken from updated estimated breast boundary points.
Figure 13A:
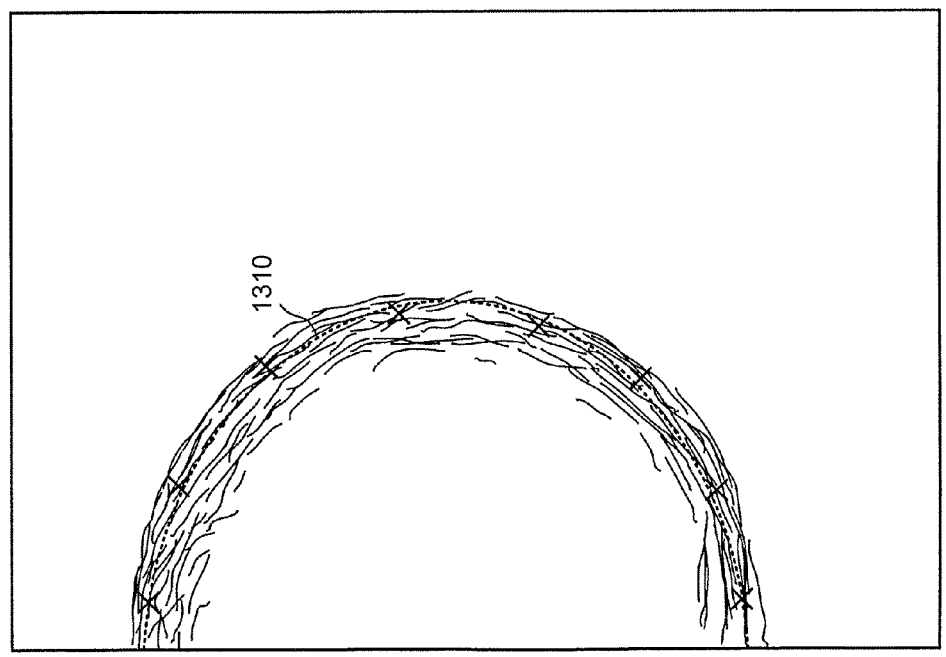

The updated control points are subsequently used to calculate a new best fit ellipse 1310, FIGS. 13A and 13B, for the breast skin line. This procedure is repeated (new equally spaced control points are calculated and the FIG. 12 calculations are repeated) until either a maximum number of iterations is reached or until the ellipse parameters change by less than a defined threshold.

Figure 14:
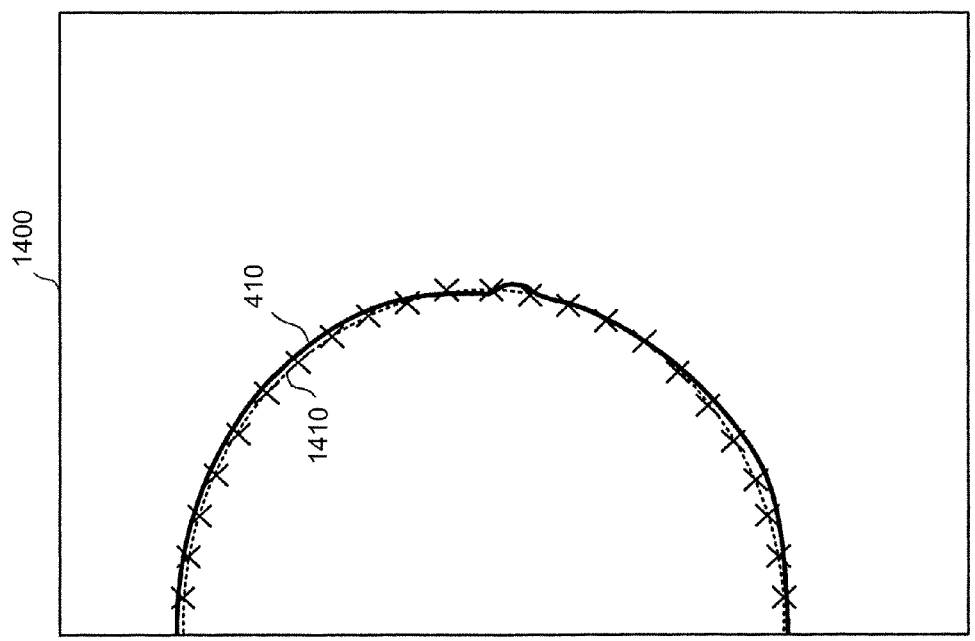
FIG. 14 shows a final elliptical estimate of the breast boundary, represented by spaced points along the ellipse boundary.

Once ellipse updates have converged or stopped, the ellipse is converted to a start model 1410, as shown in FIG. 14. The start model describes the breast boundary as a set of equally spaced points lying along the start model ellipse. The start model should lie fairly close to the actual skin line, with the accuracy depending on how close the breast image approximates an ellipse.

Figure 15:
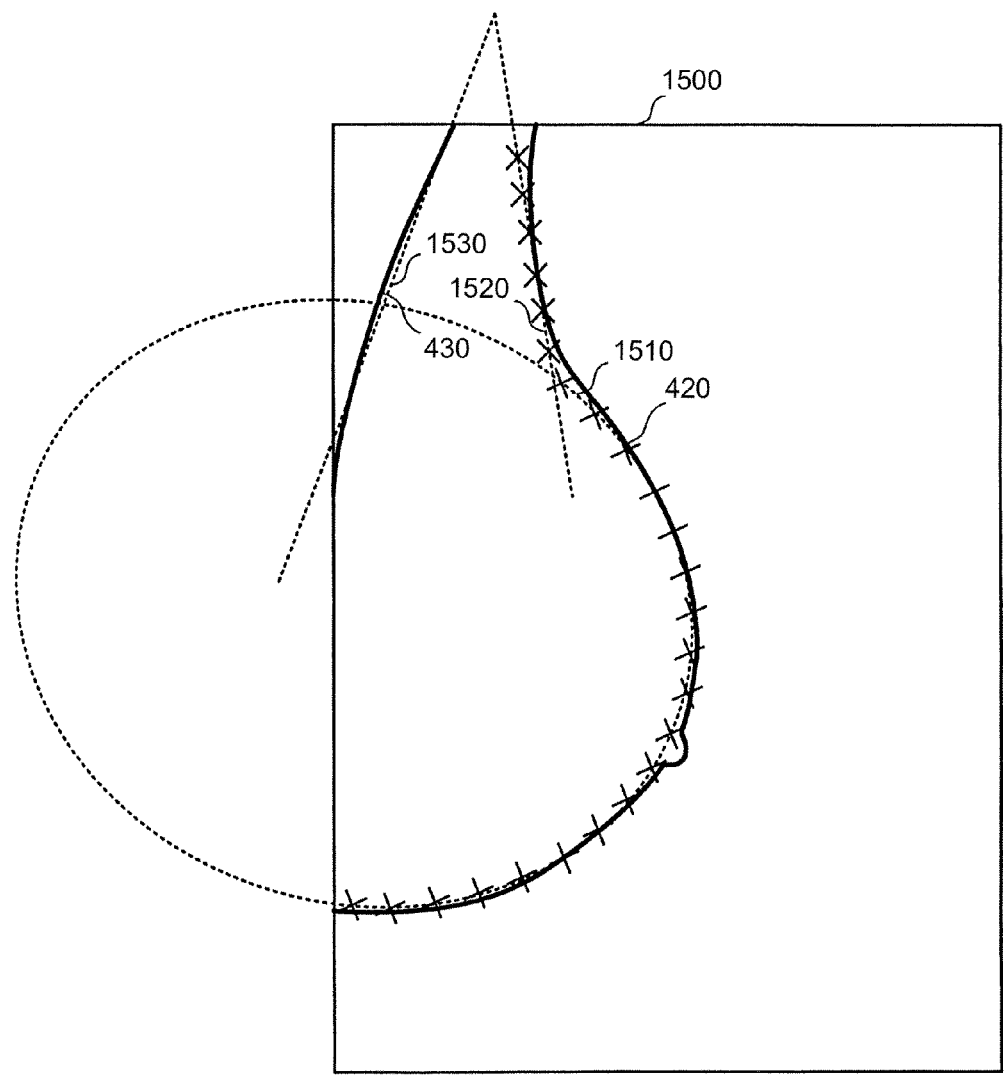
FIG. 15 illustrates final breast boundary and pectoral line estimates for an MLO view.

For an MLO view such as shown in FIG. 15, additional calculations are performed to provide a start model for the upper skin line and pectoral line 430. The pectoral line presents itself as an extremely strong second derivative contour in the upper left corner of the image, with an orientation roughly up and left. The outermost such contour found provides points for a least squares fit to a pectoral line 1530.

For the upper skin line, contours in the area above elliptical fit 1510 and to the right of the pectoral line, and with a generally left orientation are considered. Methods such as those described above for the elliptical fit are used to select and weight the contours, but this time for a least squares line fit to a line 1520.

Like for the CC view of FIG. 14, the start model is converted to a set of equally spaced points. Where line 1520 and ellipse 1510 overlap, the outer breast bound is defined at each row as the outermost of line 1520 and ellipse 1510. In FIG. 15, the projections of lines 1520 and 1530 do not intersect within the image bounds. In some images, however, these lines will intersect within the view. In such case, the outer breast bound is defined at each row as the outermost of the two lines.

Returning to FIG. 5, the start model as described herein is useful for coarse and fine boundary refinement 506 and 508 at finer scales, and without the constraint of fitting simple geometrical models. The pectoral line is also more accurately located at a fine scale at block 510. Finally, a full-resolution segmentation mask defines each pixel in the image as background, breast tissue, or muscle.

Unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless otherwise indicated.

Figure 16:
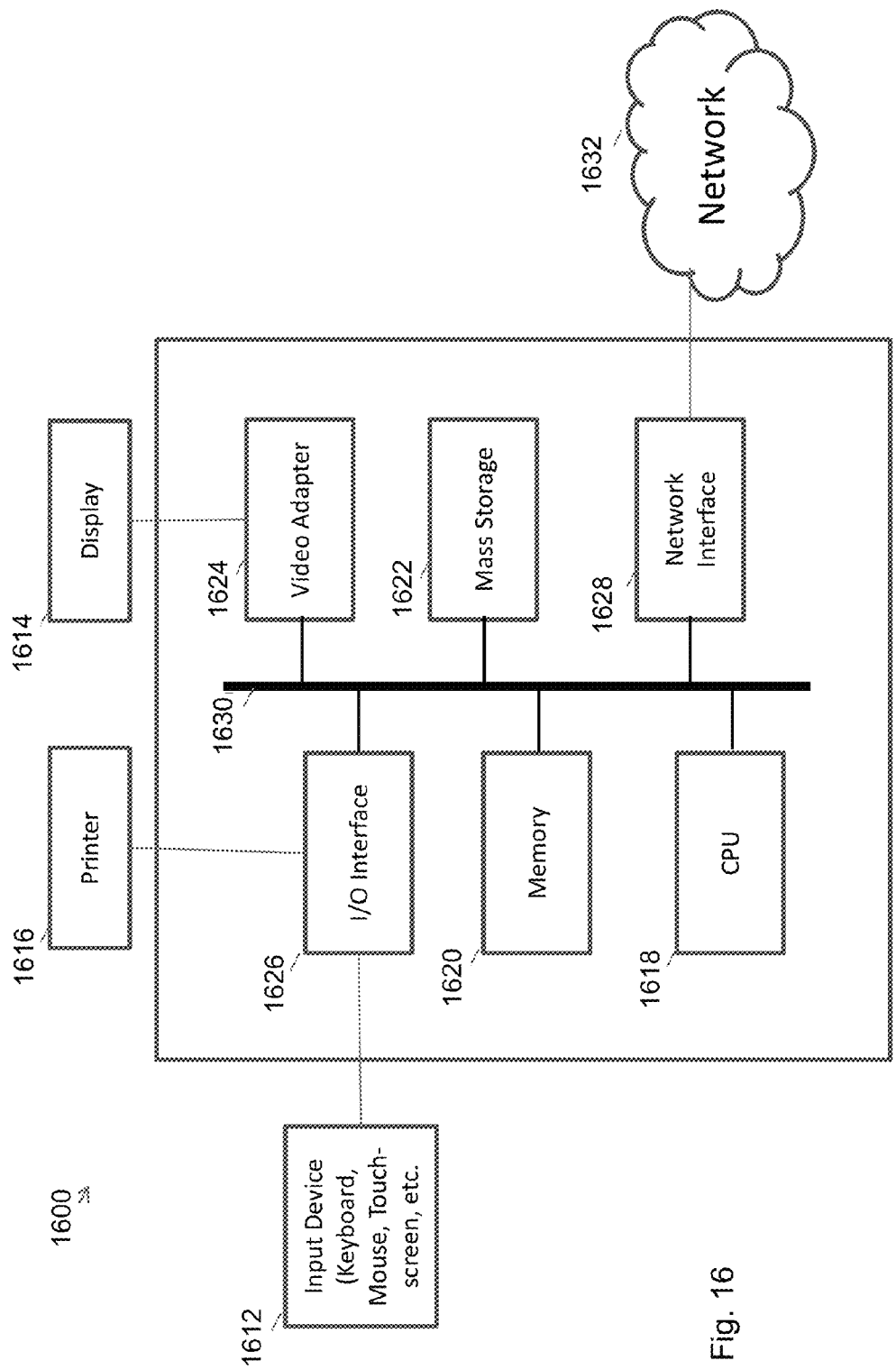
FIG. 16 is a block diagram of a desktop computing device in accordance with an embodiment of the present invention.

For example, FIG. 16 is a block diagram of a computing system 1600 that may also be used in accordance with an embodiment. It should be noted, however, that the computing system 1600 discussed herein is provided for illustrative purposes only and that other devices may be used. The computing system 1600 may comprise, for example, a desktop computer, a workstation, a laptop computer, a personal digital assistant, a dedicated unit customized for a particular application, or the like. Accordingly, the components of the computing system 1600 disclosed herein are for illustrative purposes only and other embodiments of the present invention may include additional or fewer components.

In an embodiment, the computing system 1600 comprises a processing unit 1610 equipped with one or more input devices 1612 (e.g., a mouse, a keyboard, or the like), and one or more output devices, such as a display 1614, a printer 1616, or the like. Preferably, the processing unit 1610 includes a central processing unit (CPU) 1618, memory 1620, a mass storage device 1622, a video adapter 1624, an I/O interface 1626, and a network interface 1628 connected to a bus 1630. The bus 1630 may be one or more of any type of several bus architectures including a memory bus or memory controller, a peripheral bus, video bus, or the like. The CPU 1618 may comprise any type of electronic data processor. For example, the CPU 1618 may comprise a processor (e.g., single core or multi-core) from Intel Corp. or Advanced Micro Devices, Inc., a Reduced Instruction Set Computer (RISC), an Application-Specific Integrated Circuit (ASIC), or the like. The memory 1620 may comprise any type of system memory such as static random access memory (SRAM), dynamic random access memory (DRAM), synchronous DRAM (SDRAM), read-only memory (ROM), a combination thereof, or the like. In an embodiment, the memory 1620 may include ROM for use at boot-up, and DRAM for data storage for use while executing programs. The memory 1620 may include one of more non-transitory memories.

The mass storage device 1622 may comprise any type of storage device configured to store data, programs, and other information and to make the data, programs, and other information accessible via the bus 1628. In an embodiment, the mass storage device 1622 is configured to store the program to be executed by the CPU 1618. The mass storage device 1622 may comprise, for example, one or more of a hard disk drive, a magnetic disk drive, an optical disk drive, or the like. The mass storage device 1622 may include one or more non-transitory memories.

The video adapter 1624 and the I/O interface 1626 provide interfaces to couple external input and output devices to the processing unit 1610. As illustrated in FIG. 16, examples of input and output devices include the display 1614 coupled to the video adapter 1624 and the mouse/keyboard 1612 and the printer 1616 coupled to the I/O interface 1626. Other devices may be coupled to the processing unit 1610.

The network interface 1628, which may be a wired link and/or a wireless link, allows the processing unit 1610 to communicate with remote units via the network 1632. In an embodiment, the processing unit 1610 is coupled to a local-area network or a wide-area network to provide communications to remote devices, such as other processing units, the Internet, remote storage facilities, or the like.

It should be noted that the computing system 1600 may include other components. For example, the computing system 1600 may include power supplies, cables, a motherboard, removable storage media, cases, a network interface, and the like. These other components, although not shown, are considered part of the computing system 1600. Furthermore, it should be noted that any one of the components of the computing system 1600 may include multiple components. For example, the CPU 1618 may comprise multiple processors;

the display 1614 may comprise multiple displays, and/or the like. As another example, the computing system 1600 may include multiple computing systems directly coupled and/or networked.

Additionally, one or more of the components may be remotely located. For example, the display may be remotely located from the processing unit. In this embodiment, display information, e.g., locations and/or types of abnormalities, may be transmitted via the network interface to a display unit or a remote processing unit having a display coupled thereto.

Although several embodiments and alternative implementations have been described, many other modifications and implementation techniques will be apparent to those skilled in the art upon reading this disclosure. Various parameters and thresholds exist and can be varied for a given implementation with given data characteristics, with experimentation and ultimate performance versus computation time tradeoffs necessary to arrive at a desired operating point. Many different statistical variations exist for combining measurements to form an estimate, and can be substituted for the exemplary techniques described herein for combining measurements.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method for segmenting an image comprising pixels, the method comprising:
    applying a second derivative operator to the pixels to derive first and second eigenvalues and an orientation angle for each of the pixels;
    generating a seeding grid comprising an array of a subset of the pixels;
    growing a set of contours using the subset of pixels as potential contour starting points;
    pruning the set of contours to generate a pruned set of contours;
    determining a contour strength vector for each of the contour pixels based on a maximum positive one of the eigenvalues and the orientation angle of the respective contour pixel;
    generating a partial ellipse representing an estimated location of an object in the image by combining the contour strength vectors with a set of directional operators;
    dividing the partial ellipse into a plurality of support sectors, each sector including a respective control point on the partial ellipse;
    for each of the pruned contours centered in a respective sector, setting a contour strength to be a maximum of dot products of the respective contour strength vectors with a normal to the partial ellipse at the respective sector's control point, and setting a contour position to be a location of the maximum product;
    adjusting a position of each sector control point based on the contour positions weighted by the contour strengths of the pruned contours centered in the respective sector;
    fitting the partial ellipse to the adjusted positions of the control points to generate a partial fitted ellipse; and
    generating a segmentation mask of the object based on the partial fitted ellipse.

2. The method of claim 1, further comprising subsampling and smoothing the image before the applying the second derivative operator.

3. The method of claim 1, wherein a pixel spacing of the seeding grid is four pixels.

4. The method of claim 1, wherein the growing the set of contours further comprises, for each pixel in the subset of pixels, using the respective pixel as a contour starting point if its eigenvalues meet positive maximum eigenvalue criteria.

5. The method of claim 4, wherein the growing the set of contours further comprises, for each contour starting point, testing a neighboring pixel orthogonal to the starting point orientation angle, and including the neighboring pixel with the contour starting point if it meets the positive maximum eigenvalue criteria.

6. The method of claim 1, wherein the pruning comprises filtering the set of contours using at least one of an intensity profile filter and a directionality filter.

7. The method of claim 1, further comprising repeating the dividing the partial ellipse, the setting the contour strength and position for each of the pruned contours, the adjusting the position of each control point, and the fitting the partial ellipse steps using the partial fitted ellipse.

8. The method of claim 1, wherein the image is a mammogram image, wherein the object is a breast, and wherein the adjusted ellipse represents a breast skin line.

9. The method of claim 8, further comprising:
    generating a straight-line model of an upper skin line of the breast, and
    combining the straight-line model with the adjusted ellipse before the generating the segmentation mask.

10. The method of claim 9, further comprising generating a straight-line model of a pectoral line in the image, and using the pectoral line model in the segmentation mask generation.

11. A system for segmenting an image comprising pixels, the system comprising:
    a curvature image generator applying a second derivative operator to the pixels to derive first and second eigenvalues and an orientation angle for each of the pixels;
    a seeding grid generator generating a seeding grid comprising an array of a subset of the pixels;
    a contour generator growing a set of contours using the subset of pixels as potential contour starting points;
    a contour pruner pruning the set of contours to generate a pruned set of contours;
    a vector generator determining a contour strength vector for each of the contour pixels based on a maximum positive one of the eigenvalues and the orientation angle of the respective contour pixel;
    an ellipse generator generating a partial ellipse representing an estimated location of an object in the image by combining the contour strength vectors with a set of directional operators;
    a sector divider dividing the partial ellipse into a plurality of support sectors, each sector including a respective control point on the partial ellipse;
    a contour strength detector setting, for each of the pruned contours centered in a respective sector, a contour strength to be a maximum of dot products of the respective contour strength vectors with a normal to the partial ellipse at the respective sector's control point, and setting, for each of the pruned contours centered in the respective sector, a contour position to be a location of the maximum product;
    a control point adjuster adjusting a position of each sector control point based on the contour positions weighted by the contour strengths of the pruned contours centered in the respective sector;
    an ellipse adjuster fitting the partial ellipse to the adjusted positions of the control points to generate a partial fitted ellipse; and a segmentation mask generator generating a segmentation mask of the object based on the partial fitted ellipse.

12. A computer program product for segmenting an image, the computer program product having a non-transitory computer-readable medium with a computer program embodied thereon, the computer program comprising:

computer program code for applying a second derivative operator to the pixels to derive first and second eigenvalues and an orientation angle for each of the pixels;

computer program code for generating a seeding grid comprising an array of a subset of the pixels;

computer program code for growing a set of contours using the subset of pixels as potential contour starting points;

computer program code for pruning the set of contours to generate a pruned set of contours;

computer program code for determining a contour strength vector for each of the contour pixels based on a maximum positive one of the eigenvalues and the orientation angle of the respective contour pixel;

computer program code for generating a partial ellipse representing an estimated location of an object in the image by combining the contour strength vectors with a set of directional operators;

computer program code for dividing the partial ellipse into a plurality of support sectors, each sector including a respective control point on the partial ellipse;

computer program code for setting, for each of the pruned contours centered in a respective sector, a contour strength to be a maximum of dot products of the respective contour strength vectors with a normal to the partial ellipse at the respective sector's control point, and for setting, for each of the pruned contours centered in a respective sector, a contour position to be a location of the maximum product;

computer program code for adjusting a position of each sector control point based on the contour positions weighted by the contour strengths of the pruned contours centered in the respective sector;

computer program code for fitting the partial ellipse to the adjusted positions of the control points to generate a partial fitted ellipse; and computer program code for generating a segmentation mask of the object based on the partial fitted ellipse.

13. The computer program product of claim 12, further comprising computer program code for subsampling and smoothing the image before the applying the second derivative operator.

14. The computer program product of claim 12, wherein a pixel spacing of the seeding grid is four pixels.

15. The computer program product of claim 12, wherein the computer program code for growing the set of contours further comprises computer program code for using, for each pixel in the subset of pixels, the respective pixel as a contour starting point if its eigenvalues meet positive maximum eigenvalue criteria.

16. The computer program product of claim 15, wherein the computer program code for growing the set of contours further comprises, computer program code for testing, for each contour starting point, a neighboring pixel orthogonal to the starting point orientation angle, and computer program code for including the neighboring pixel with the contour starting point if it meets the positive maximum eigenvalue criteria.

17. The computer program product of claim 12, wherein the computer program code for pruning comprises computer program code for filtering the set of contours using at least one of an intensity profile filter and a directionality filter.

18. The computer program product of claim 12, further comprising computer program code for repeating the dividing the partial ellipse, the setting the contour strength and position for each of the pruned contours, the adjusting the position of each control point, and the fitting the partial ellipse steps using the partial fitted ellipse.

19. The computer program product of claim 12, wherein the image is a mammogram image, wherein the object is a breast, and wherein the adjusted ellipse represents a breast skin line.

20. The computer program product of claim 19, further comprising:
computer program code for generating a straight-line model of an upper skin line of the breast, and
computer program code for combining the straight-line model with the adjusted ellipse before the generating the segmentation mask.

21. The computer program product of claim 20, further comprising computer program code for generating a straight-line model of a pectoral line in the image, and for using the pectoral line model in the segmentation mask generation.

* * * * *

UNITED STATES PATENT AND TRADEMARK OFFICE
CERTIFICATE OF CORRECTION

Page 1 of 1

PATENT NO. : 8,675,934 B2
APPLICATION NO. : 13/168614
DATED : March 18, 2014
INVENTOR(S) : Jeffrey C. Wehnes It is certified that error appears in the above-identified patent and that said Letters Patent is hereby corrected as shown below:

On the Title page, Item (60), Related U.S. Application Data, lines 11-14, delete "provisional application No. 61/398,571, filed on Jun. 25, 2010, provisional application No. 61/399,094, filed on Jul. 7, 2010, provisional application No. 61/400,573, filed on Jul. 28, 2010".

Signed and Sealed this
Twenty-fourth Day of June, 2014

Michelle K. Lee
*Deputy Director of the United States Patent and Trademark Office*